June 28, 1927.
O. C. REIBER
BIRD HOUSE
Filed Sept. 4, 1925
1,634,209
2 Sheets-Sheet 1
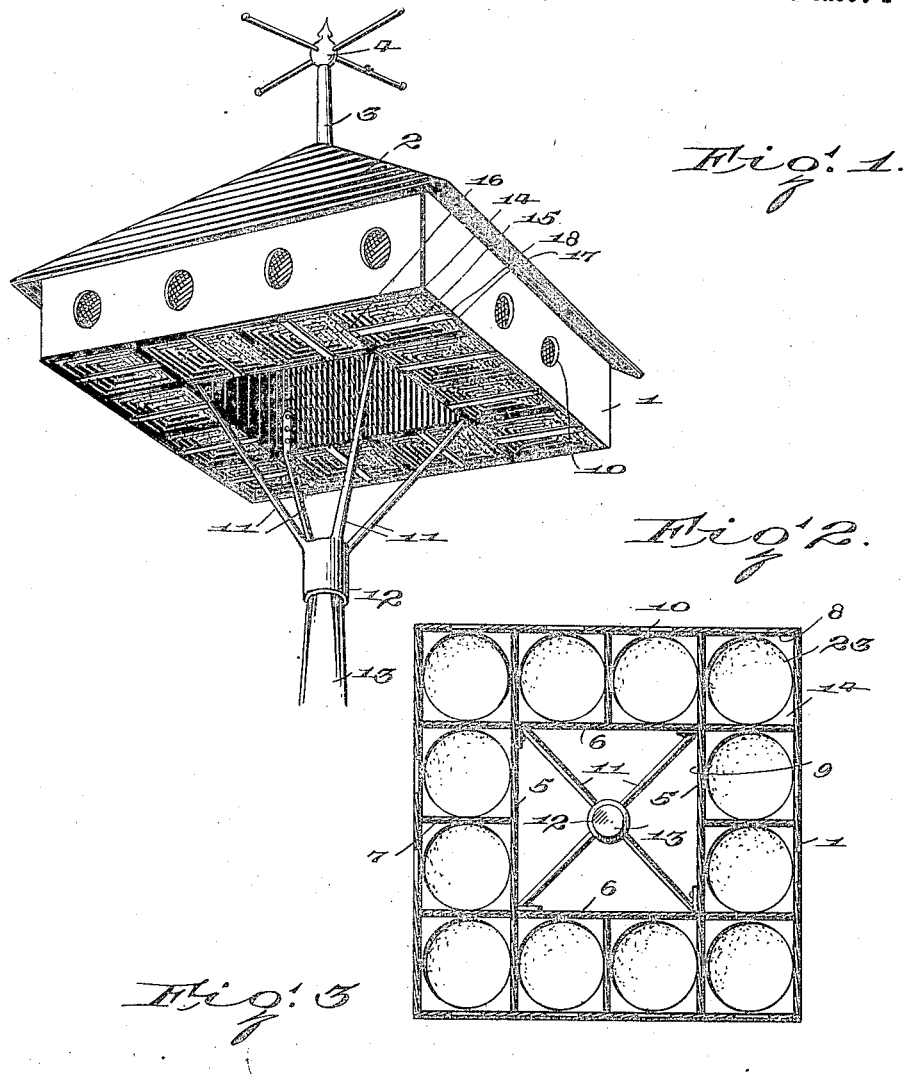
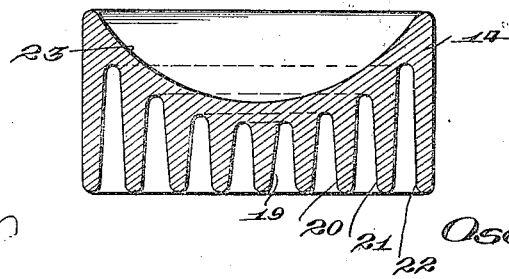
WITNESSES
INVENTOR
Oscar C. Reiber
BY
ATTORNEYS

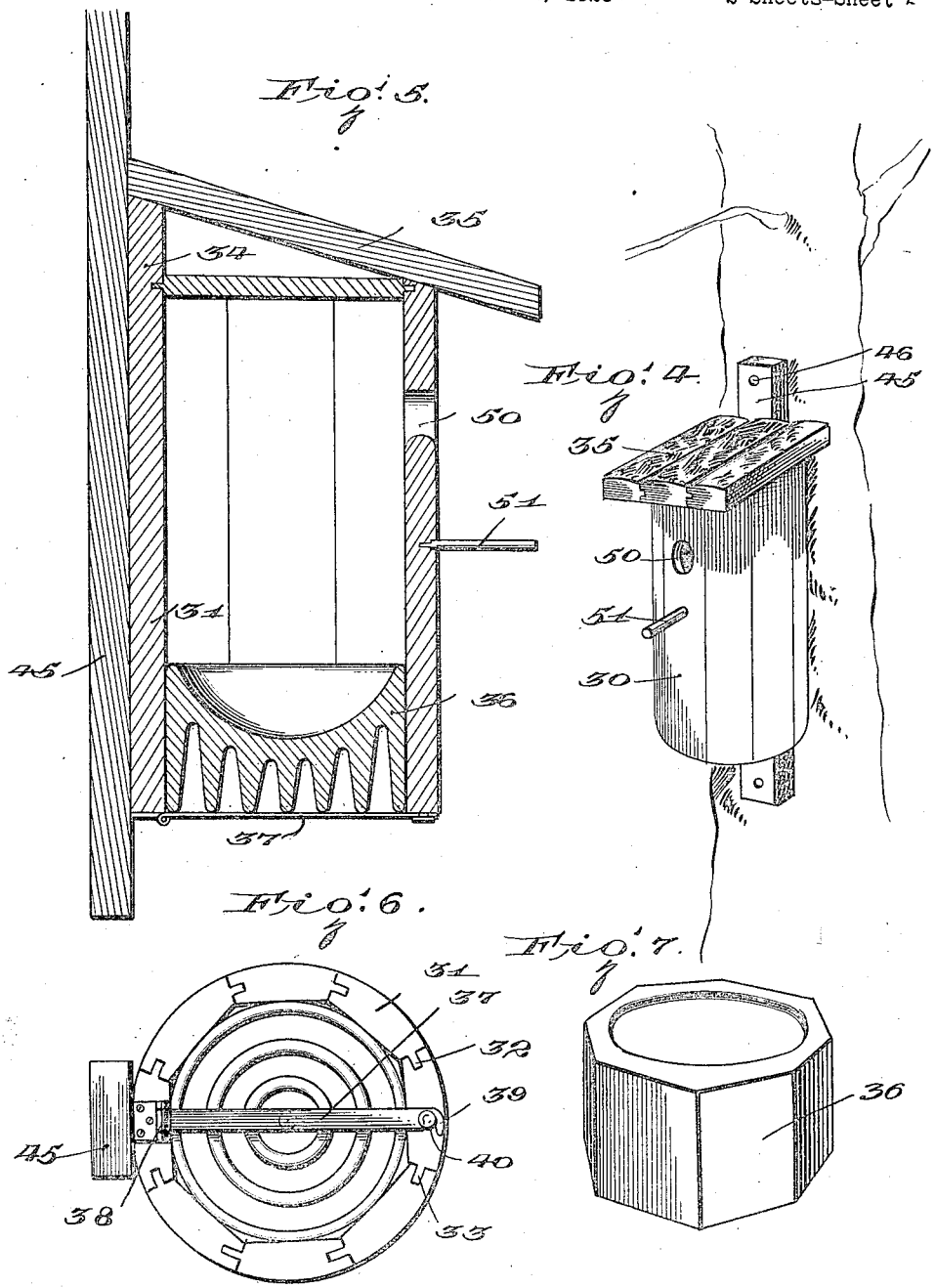

Patented June 28, 1927.

1,634,209

UNITED STATES PATENT OFFICE.

OSCAR C. REIBER, OF WEST WEBSTER, NEW YORK.

BIRD HOUSE.

Application filed September 4, 1925. Serial No. 54,494.

My invention is a house in which birds may nest, and it consists in the combinations, constructions and arrangements herein described and claimed.

An object of the invention is the provision of a bird house which affords facilities for the nesting of birds in a location in which provision is made for securing temperature and moisture conditions desirable for the incubation of the eggs and for the health and satisfactory growth of the young birds.

A further object of the invention is the provision of a bird house of the character described which may be adapted to accommodate the species of birds that require a single nest and house or the species which nest in a colony.

A still further object of the invention is the provision in a bird house of the character described of a novel nest-bottom which is adapted to absorb moisture from the atmosphere and to retain a large percentage of such moisture while at the same time the nest-bottom tends to repel vermin by virtue of the cool and moist condition which it engenders and also by virtue of the inclusion in its composition of active vermin destroying substances.

Other objects and advantages of the invention will be apparent from the following description, considered in conjunction with the accompanying drawings, in which:

Figure 1 is a perspective view of a bird house embodying the invention and adapted to house a plurality of nesting birds, Figure 2 is a horizontal section through the body of the house, Figure 3 is a relatively enlarged section through one of the nest-bottoms of the compartments of the house, Figure 4 is a perspective view of a bird house embodying the invention and adapted for the species that nest in a single compartment, Figure 5 is a view in central vertical section of the house shown in Fig. 4, parts being shown in elevation, Figure 6 is a bottom plan view of the house shown in Figs. 3 and 4. and Figure 7 is a detail perspective view of the nest bottom shown in Figs. 4, 5 and 6.

The improved bird house has a body comprising a vertically disposed shell 1 which may have any desirable configuration in cross sectional contour, shown in Figs. 1 and 2 as being substantially square. A roof structure 2 of any suitable and desirable construction and form is secured on the shell 1 and preferably has eaves portions extending outwardly and downwardly from the upper edge of the shell 1 to assure proper drainage. The roof structure may carry a pole 3 which may be upstanding on the central portions of the roof and may carry perches 4.

Vertical partitions, such as indicated at 5, 6 and 7, respectively, may be secured in any suitable known manner within the shell to produce a single or a plurality of vertical compartments 8 carried in a series next to the shell 1 and surrounding a central vertical ventilating shaft or space 9 for the use of single and colony nesting birds. The partitions 5, 6 and 7 and the shell 1 preferably terminate at their lower edges in the same plane. If desired one or more of these partitions may be extended upwardly to the roof to provide entirely separated nesting compartments.

Each compartment 8 is provided with a lateral opening 10 formed in the outer shell 1 and through which a bird may pass to enter or leave the compartment.

The bird house may be supported in elevated position on the upper end portions of four equally spaced divergent inclined arms 11 of a bracket which includes a vertical tubular portion 12 that is secured on the upper end portion of a vertical pole or standard 13, the upper end portions of the bracket arms being secured to the wall of the central ventilating space 9, preferably in the corner portions of the latter.

A removable nest-bottom 14 fits in the lower end of each of the compartments 8 and is retained therein by a bar 15 which is swingingly attached at one end, as at 16, to the lower edge of a portion of the wall of the compartment and is adapted at its other end, as by being provided with the hook 17, to be releasably engaged with a keeper element, such as the headed stud 18 that depends from the lower edge of the opposite portion of the wall of said compartment, whereby the bar 15 will extend across the lower end of the compartment and will retain the nest-bottom in place. The nest-bottom of course can be removed for the purpose of cleaning or replacement when desired.

Each nest-bottom 14 is of novel construction and constitutes an important element of the invention. The nest-bottom is formed by moulding or otherwise so that a relatively large surface area will be exposed to the atmosphere for a nest-bottom of a given cross sectional area when the nest-bottom is in place in the compartment 8 for which it is provided. To this end, each nest-bottom is formed with a series of endless spaced vertical channels such as indicated at 19, 20, 21 and 22, respectively, in the lower face thereof, and with a concavity 23 in the upper face of the nest-bottom. The concavity 23 of course is provided principally to accommodate the eggs of the nesting birds and the young birds. The channels in the lower face of the nest-bottom increase in height from the center of the nest-bottom toward the outer edge of the latter or directly as the depth of the concavity 23 decreases. The nest-bottom conforms in cross sectional contour to the cross-section of the associated compartment 8 and fits snugly in the lower end of the latter.

Each nest-bottom is made of material having good moisture absorbing and retaining properties and which will tend to repel vermin. A mixture of wood pulp (moss), fine sand, and Portland cement has been found to be satisfactory for use in forming the nest-bottom.

The embodiment of the invention shown in Figs. 4 to 7, inclusive, shows a single compartment bird house made especially for the species that nest in a single compartment or that originally have nested in the deserted cavities made by woodpeckers. As shown in Fig. 4 the bird house is designated at 30 and consist of vertically disposed pieces of wood or other material, designated at 31, and having interfitting tongues and grooves, designated at 32 and 33, respectively. The exterior of the pieces 31 may be machined to simulate the bark of a tree. One of the pieces 31 is somewhat longer than the other and projects above the top of the house, as indicated at 34 so that the roof members 35 are inclined. The roof members 35 are similar to the pieces or body members 31. A nest bottom, designated at 36, is set up in the lower end of the house and is held in position by means of a bar 37 having one portion hinged, as at 38, to one of the pieces 31 and having its other end formed with a hook 39 engageable with a headed stud 40 provided on an opposite piece 31. The bar 37 is sufficiently resilient to permit it to be flexed laterally to such an extent as to effect engagement and disengagement of its hook 39 with the stud 40. When the hook 39 is engaged with the stud 40 the bar 37 holds the nest-bottom 36 in position in the house and when the hook 39 is disengaged from the stud 40 the bar 37 may be swung downwardly to permit of removal of the nest bottom 36. The nest-bottom 36 is identical with the nest-bottom 14 except that its periphery is of octagonal form to conform to the shape of the bird house. Of course, it is to be understood that the bird house may be made of various shapes and that the nest bottoms are always made to conform to the shape of the bird house. The entire bird house is mounted on a bar 45 which may consist simply of a piece of wood and the element 45 is secured to the tree in any suitable way, as by means of nails 46.

The house 30 is provided with an entrance opening 50 and with a porch 51 below the entrance opening.

The particular house shown in the drawings is constructed to conform with the natural requirements of cavity-nesting birds which may cling to the external surface of the house which may be machined up to imitate the bark. The house may be easily fastened to trees and, of course, the house may be constructed in a number of styles to suit the requirements of the particular cavity-nesting birds for whom the nest is supplied.

I claim:

1. In a bird house, a nesting compartment open at its lower end, and a nest-bottom made of moisture absorbent material and fitting in the lower end of the compartment, said nest-bottom having spaced ventilating channels in its lower face, said channels being open to the atmosphere at their bottoms.

2. In a bird house, a nesting compartment open at its lower end, and a nest-bottom made of moisture absorbent material and fitting in the lower end of the compartment, said nest-bottom having spaced endless ventilating channels in its lower face, increasing in height as the radial distance of the channel from the vertical median line of the nest-bottom increases.

3. In a bird house, a nesting compartment open at its lower end, and a nest-bottom made of moisture absorbent material and fitting in the lower end of the compartment, said nest-bottom having spaced endless ventilating channels in its lower face, increasing in height as the radial distance of the channel from the vertical median line of the nest-bottom increases, said nest-bottom also having a concavity in its upper face, 4. In a bird house, a nesting compartment open at its lower end, a nest-bottom fitting in the lower end of the compartment and being made of a mixture of wood pulp (moss), fine sand and Portland cement.

5. In a bird house, a nesting compartment open at its lower end, and a nest-bottom made of moisture absorbent material and fitting in the lower end of the compartment, said nest-bottom having a series of regularly spaced concentric endless channels formed in its lower face, said channels being continuously open to the atmosphere at their bottoms and decreasing in width from their bottom edges to their upper ends.

OSCAR C. REIBER.